(12) United States Patent
Beaver et al.

(10) Patent No.: US 9,330,407 B2
(45) Date of Patent: May 3, 2016

(54) SPECIFICATION AND DISPLAY OF PRODUCT CUSTOMIZATION OPTIONS

(71) Applicant: ZAZZLE.COM, INC., Redwood City, CA (US)

(72) Inventors: Jeffrey Beaver, Redwood City, CA (US); Robert Irven Beaver, III, Redwood City, CA (US); Leslie Young Harvill, Half Moon Bay, CA (US)

(73) Assignee: ZAZZLE INC., Redwood City, CA (US)

( * ) Notice: Subject to any disclaimer, the term of this patent is extended or adjusted under 35 U.S.C. 154(b) by 533 days.

(21) Appl. No.: 13/844,081

(22) Filed: Mar. 15, 2013

(65) Prior Publication Data

US 2014/0279180 A1 Sep. 18, 2014

(51) Int. Cl.
*G06Q 30/00* (2012.01)
*G06Q 30/06* (2012.01)

(52) U.S. Cl.
CPC ........ *G06Q 30/0621* (2013.01); *G06Q 30/0601* (2013.01); *G06Q 30/0641* (2013.01); *G06Q 30/0643* (2013.01)

(58) Field of Classification Search
CPC .......... G06Q 30/0601; G06Q 30/0621; G06Q 30/0641; G06Q 30/0643
USPC ............................. 705/26.1, 26.5, 27.1, 27.2
See application file for complete search history.

(56) References Cited

U.S. PATENT DOCUMENTS

| | | | | |
|---|---|---|---|---|
| 5,970,471 A | * | 10/1999 | Hill | G06Q 30/02 705/26.8 |
| 6,167,383 A | * | 12/2000 | Henson | G06Q 10/087 703/13 |
| D454,138 S | | 3/2002 | Imamura et al. | |
| 6,414,693 B1 | * | 7/2002 | Berger | G06Q 10/087 345/641 |

(Continued)

FOREIGN PATENT DOCUMENTS

| CN | 104156860 A | 11/2014 |
|---|---|---|
| WO | WO 2010/014750 A1 | 2/2010 |

OTHER PUBLICATIONS

Stafford, A., "A Pixel's Worth a Thousand Words," PC World, vol. 18, No. 8, pp. 161-169, Aug. 2000.*

(Continued)

*Primary Examiner* — Nicholas D Rosen
(74) *Attorney, Agent, or Firm* — Hickman Palermo Becker Bingham LLP

(57) ABSTRACT

In an embodiment, a method includes receiving one or more attribute location inputs. Each attribute location input identifies a location within a product image depicting a customizable product. The method includes receiving an attribute definition for each of the one or more attribute location inputs. The method also includes storing customization information that associates the locations specified in the location inputs with attribute definition information included in the respective attribute definition. In another embodiment, a method includes causing the display of a product image depicting a customizable product. One or more locations within the product image are each associated with a respective customizable attribute. The method includes causing the display of an attribute image representing a particular customizable attribute associated with the particular location in association with a particular location of the one or more locations within the product selection image.

32 Claims, 8 Drawing Sheets

(56) References Cited

U.S. PATENT DOCUMENTS

| | | | |
|---|---|---|---|
| 6,985,876 B1* | 1/2006 | Lee | G06Q 30/06 |
| | | | 705/26.5 |
| D589,526 S | 3/2009 | Taylor et al. | |
| D614,634 S | 4/2010 | Nilsen | |
| D636,779 S | 4/2011 | Boush et al. | |
| D643,044 S | 8/2011 | Ording | |
| 8,201,103 B2 | 6/2012 | Dukhon et al. | |
| 8,212,805 B1* | 7/2012 | Banschick | G06Q 10/101 |
| | | | 345/418 |
| D664,981 S | 8/2012 | Rai et al. | |
| D685,813 S | 7/2013 | Bork et al. | |
| D697,524 S | 1/2014 | Ording | |
| D716,829 S | 11/2014 | Sik | |
| 9,165,409 B2* | 10/2015 | Nigam | G06T 19/20 |
| 2001/0013014 A1* | 8/2001 | Fukumuro | G06Q 30/06 |
| | | | 705/26.5 |
| 2001/0049644 A1* | 12/2001 | Webb | B29C 47/0019 |
| | | | 705/26.5 |
| 2002/0107672 A1* | 8/2002 | Povich | G05B 19/41865 |
| | | | 703/1 |
| 2004/0078276 A1* | 4/2004 | Shimogori | G06Q 30/0641 |
| | | | 705/27.1 |
| 2005/0075746 A1 | 4/2005 | Malone et al. | |
| 2005/0102199 A1* | 5/2005 | Lee | G06Q 30/06 |
| | | | 705/26.5 |
| 2005/0289018 A1* | 12/2005 | Sullivan | G06Q 30/00 |
| | | | 705/26.5 |
| 2006/0184425 A1* | 8/2006 | Hanechak | G06Q 30/02 |
| | | | 705/26.5 |
| 2007/0033568 A1 | 2/2007 | Barrieau et al. | |
| 2007/0168391 A1* | 7/2007 | Coschigano | G06Q 30/0603 |
| 2008/0177639 A1* | 7/2008 | Kuppersmith | G06Q 10/00 |
| | | | 705/26.5 |
| 2009/0002370 A1 | 1/2009 | Helfman | |
| 2009/0193360 A1 | 7/2009 | Escuer | |
| 2011/0191708 A1* | 8/2011 | Reed | G06F 3/048 |
| | | | 715/765 |
| 2012/0131519 A1 | 5/2012 | Jitkoff | |
| 2013/0050205 A1* | 2/2013 | Beaver, III | G06Q 30/0643 |
| | | | 345/419 |
| 2013/0050218 A1* | 2/2013 | Beaver, III | G06Q 30/0643 |
| | | | 345/440 |
| 2014/0232734 A1* | 8/2014 | Nigam | G06T 19/20 |
| | | | 345/584 |

OTHER PUBLICATIONS

European Patent Office, "Search Report" in application No. 1415980003-1958, dated May 16, 2014, 5 pages.

Current Claims in European application No. 141598003-1958, dated May 2014, 4 pages.

U.S. Appl. No. 29/459,174, filed Jun. 26, 2013, Final Office Action.

Canadian Intellectual Property Office, "Application for Registration of an Industrial Design Examiner's Report" in application No. 154526, dated Jun. 27, 2014, 2 pages.

* cited by examiner

SPECIFICATION AND DISPLAY OF PRODUCT CUSTOMIZATION OPTIONS

TECHNICAL FIELD

The present disclosure generally relates to techniques for the specification of product customization options and the presentation of the product customization options in computer systems that support visualization and ordering of custom manufactured products.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Customized goods are a highly appealing option for consumers with particular product requirements and consumers desiring unique products. Many different attributes of a goods may be customized such as, size, shape, length, texture, etc. The particular attributes which are customizable may vary depending on the type of product being customized or the seller providing the customizable product.

Such customized goods may be viewed and purchased through a user interface of a computer system, such as a web browser. When determining whether to purchase a customized product, a customer would find it helpful to view sample images depicting visualizations of selected customizations as the customer is making selections. One approach for providing a customer with sample images includes a manufacturer providing images for each combination of selected customization options prior to receiving the customer's selections of customization options. In response to a customer selecting a particular set of customization options, the particular image depicting that combination of customization options could be retrieved and displayed to the user. For example, in response to a user selecting an 8" diameter and a square shape for a customizable dinner plate, a particular pre-defined, stored image of a dinner plate of the selected size and shape may be retrieved and displayed.

However, in many cases, it is burdensome for the seller to provide an image for each different combination of customization options in advance of user selections, especially when there is a great number of a product option. In some cases, it may even be impossible for the seller to provide an image for a particular user-selected customization option in advance of user selection. For example, a seller may wish to provide the user with an option to enter a particular design to incorporate into the customized product.

A better approach for displaying customization options to a user during the selection process is needed. The approach needs to effectively convey the appearance of the customization options, while also not requiring a burdensome amount of images to be created by the seller.

DESCRIPTION OF EXAMPLE EMBODIMENTS

Figure 1:
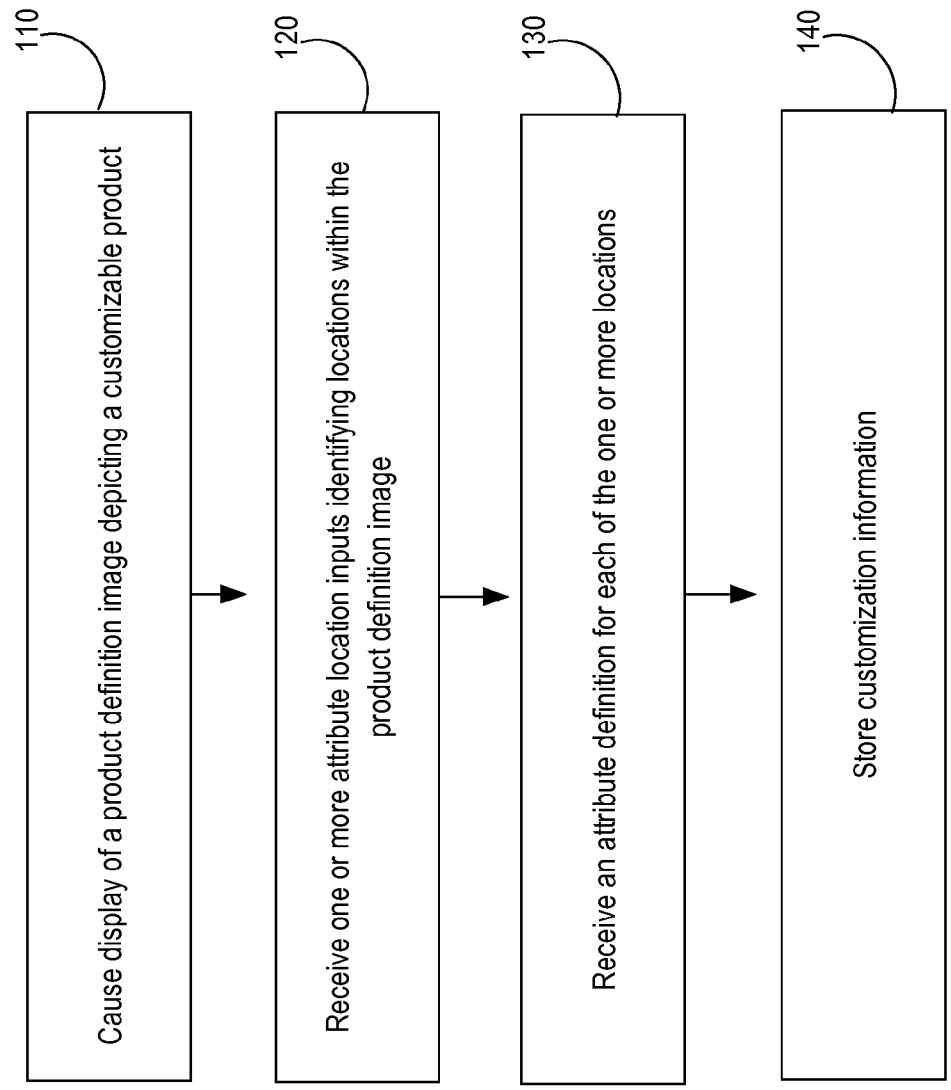
FIG. 1 illustrates an example process for acquiring customization option specifications.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1. General Overview
2. Structural and Functional Overview
3. Specification of Customization Options
4. Display and Selection of Customization Options
5. Variable Product Image Portions
6. Customization Option Specification, Customer Selection, and Manufacture
7. Implementation Mechanisms—Hardware Overview 1. General Overview Techniques are described for the specification and display of product customization options. In an embodiment, display of a product image depicting a customizable product is caused. One or more attribute location inputs are received. Each attribute location input identifies a location within the product image that does not include the entire product definition image. An attribute definition is received for each of the one or more attribute location inputs. Each attribute definition defines a customizable attribute associated with the respective attribute location input. Customization information is stored. The customization information associates the locations specified in the location inputs with attribute definition information included in the respective attribute definition.

In an embodiment, each attribute definition indicates one or more types of acceptable user inputs.

In an embodiment, each customizable attribute is associated with one or more option images, where each option image represents a respective customization option.

In an embodiment, the attribute location inputs and attribute definitions are received from a specifying entity and the product image is based on an image provided by the specifying entity.

In an embodiment, image specifications are determined based on the stored customization information. The image specifications define one or more customization options to be depicted. The image specifications are provided to an image provider.

In an embodiment, a product image depicting a customizable product is caused to display. One or more locations within the product image are each associated with a respective customizable attribute. None of the one or more locations include the entire product selection image. An attribute image is caused to display in association with a particular location of the one or more locations within the product image is caused. The attribute image represents a particular customizable attribute associated with the particular location. The customizable attribute is an attribute of the product that is customizable.

In an embodiment, the display of the attribute image is caused in response to determining a selection of the particular point or region.

In an embodiment, the attribute image represents a particular customization option.

In an embodiment, the attribute image represents a default customization option.

In an embodiment, the customizable attribute is associated with a plurality of customization options, including a particular customization option. A selection of the particular customization option is received. In response to receiving the selection of the customization option, a particular customization option image representing the selected particular customization option is caused to display.

In an embodiment, the particular customization option image replaces the attribute image.

In an embodiment receiving the selection of the particular customization option comprises receiving a design input. The particular customization option image depicts a design included in the design input.

In an embodiment, a particular user input type associated with the particular customizable attribute is determined. An input area of the particular user input type is caused to be displayed.

2. Structural and Functional Overview

In an embodiment, a customization option specification is obtained from an entity capable of specifying the different ways in which a product can be customized. A product image depicting the customizable product may be displayed to the specifying entity, and the specifying entity may identify locations within the product image that are to represent customizable attributes of the customizable product. The specifying entity may also provide attribute definitions for the customizable attributes, which may include one or more images representing each customizable attribute. Customization information, which may be determined based on the received attribute location inputs and attribute definitions, is stored and may subsequently be used during the display of customization options to a customer.

In an embodiment, customization options are indicated to a customer by displaying a product image, where locations within the product image that represent different customizable attribute may be highlighted and annotated with attribute images. The attribute images may depict the corresponding attribute that is represented by the location. In an embodiment, in response to a customer selecting a particular customization option, the attribute image is updated to display an option image representing the selected customization option. By displaying customization option selections as images that annotate locations within the product image, the customer will be better able to visualize how the final customized product will appear with all of the selected customization options incorporated. Further, the approaches herein give the specifying entity complete flexibility with respect to specifying which different parts of a product are capable of customization, and the approaches are readily usable by specifying entities that have limited experience in using computer systems for custom product specification or display.

3. Customization Option Specification Process

Figure 6:
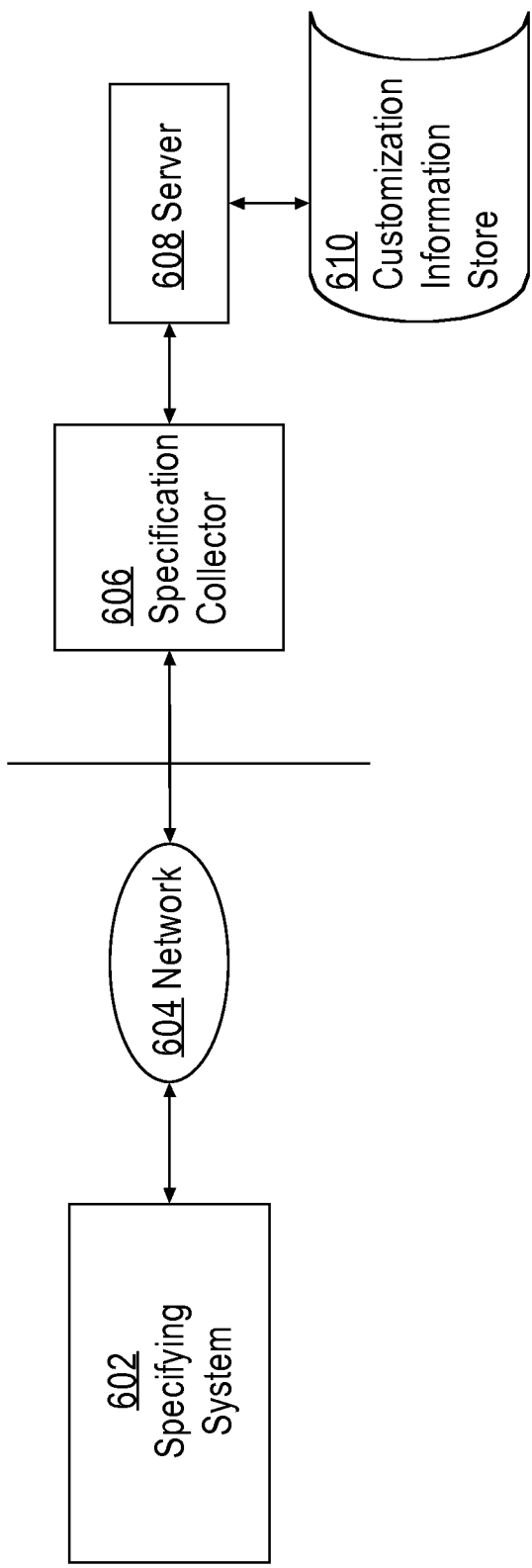
FIG. 6 illustrates a computer system that may be used to implement customization option specification processes described herein

FIG. 6 illustrates a computer system that may be used to implement customization option specification processes described herein. Specifying system 602 may be a system local to a specifying entity. The specifying system may be a smartphone, tablet computer, a portable computing device, or a personal computer and may comprise an electronic display such as a screen or monitor on which graphical interfaces are rendered and/or displayed. Specifying system 602 is coupled directly or indirectly through one or more networks 604 to specification collector 606, which is coupled to a server computer 608 that can access a customization information store 610. Server computer 608 may comprise a plurality of server computers.

In an embodiment, specification collector 606 causes graphics and selection tools for obtaining a specification of customization options to display on a display unit of a computer system of an end user of a specifying entity, such as specifying system 602. Specification collector 606 may be a computer that automatically causes the display of graphics and selection tools. The specification collector may be operated by a retailer of a customizable product. "Specifying entity," in this context, refers to the retailer or any other offeror of a customizable product; for example, specifying entities may be individuals, nonprofits, government units, or other entities and are not limited to commercial organizations or other traditional retailers.

The graphics and tools may be displayed to a specifying entity who specifies the ways in which a product may be customized. The specifying entity may be the maker of the customizable product. The customization specification system may send the information through the internet for display at a display unit of specifying entity that is remote to the customization specification system.

The retailer of the customizable product may sell a variety of customizable products made by a variety of different makers. The retailer may operate an online website through which customers or other users may place orders for the customizable products and specify the ways in which a product is to be customized. "Customer," in this context, refers to any user, entity or system that orders a customized product and may include individuals, businesses, and non-commercial entities. The retailer may utilize the obtained customization specification to display the product customization options to a customer according to the methods described herein. Specification collector 606 may determine customization information based on the obtained customization specification and may causer server computer 608 to store the customization information at customization information store 610.

FIG. 1 illustrates an example process for acquiring a customization option specification. A customization option specification includes information about the customizable attribute of a customizable product, such as location inputs identifying locations on, in or of a product that are to represent the customizable attributes and attribute definitions for the customizable attributes. The process illustrated in FIG. 1 is an automated process performed by a computing system such as specification collector system and may be implemented in any of software, firmware, programmable hardware logic, a special-purpose computer system, or a combination of any of the foregoing.

At block 110, the specification collector causes the display of a product image depicting a customizable product. The specifying entity may have provided the product image to the specification collector by to the specification collector prior to the display of the product image, for example, by uploading by the specifying entity to a server of the specification collector. The product image may be an enhanced or altered version of the image provided by the specifying entity.

The retailer may also cause display of graphical tools for selecting locations within the product definition image, such as a cursor that may be used to select a particular point within the product image or a particular region within the product definition image.

The specifying entity may use the displayed graphical tools to indicate attribute location inputs. The specifying entity may select indicate attribute location inputs by selecting one or more locations within the product definition image. The selection may occur at a specifying system local to the specifying entity.

The locations typically are points or regions within the product image that are not the entire image. Each selected location is to be associated with at least one customizable attribute of the customizable product and an image representing the associated customizable attribute(s). During a subsequent display of customization options, the selected locations within the product image may be highlighted, displayed distinctively in some manner, specially identified, and/or displayed in association with a respective attribute image.

The specifying entity may select a particular location within the product image based on the attribute(s) that are to be associated with the selected location. For example, a specifying entity may select a particular site for the selected location because the site is representative of the associated customizable attribute. As a particular example, customizable product may be a sofa, and one of the customizable attributes of the sofa may be the shape of the sofa arms. A specifying entity may select a particular region within the product image of the sofa that depicts the sofa arms to represent the customizable attribute of sofa arm shape. As another example, the customizable attribute may be a greeting card. The specifying entity may select a point within a product image depicting a greeting card to represent the customizable attribute of background card color, where the point is in the background region of the card, some distance away from any text or illustrations upon the card. In other embodiments, the site of the location selected to represent a particular attribute may not represent the customizable attribute to be associated with the location.

At block 120, the specification collector receives attribute location inputs from the specifying entity, which identify the one or more selected locations within the product definition image.

The locations identified in the selection inputs may be highlighted when the product image is subsequently displayed during the customization option display process. The customization options may be presented to a customer by displaying an attribute image depicting the customizable product with the selected locations highlighted, where each of the selected locations represent one or more associated customizable attributes.

For each of the selected locations, the specifying entity specifies attribute definition(s) that define the attribute(s) associated with the respective locations. The information included in the attribute definition(s) may vary according to different embodiments.

An attribute definition may specify a title name for the attributes that a respective location represents. The attribute definition may define the types of acceptable customer inputs for the corresponding attribute. For example, an attribute definition may specify that a particular attribute is a selection input attribute, where a set of customization options are to be presented to the customer and the customer selects one or more customization options from the set. A different attribute definition may specify that the corresponding attribute is a design input attribute, for which the user is to provide a design input. A design input is a custom design created by the customer. The design may be, for example, a drawing or text. Another attribute definition may specify that the associated attribute is both a selection input attribute and a design input attribute where the customer has the option to either select a presented option or to enter a custom design. For example, the customizable attribute may be engraved wording and the customer may have the option to select one of a set of prepared message for engraving or enter a custom message for engraving.

The attribute definition may specify the type of design inputs that are acceptable for the associated attributes. For example, one attribute definition may specify that only images of a particular file format are acceptable inputs for the associated attribute. Another attribute definition may specify that online drawings created using an online drawing tool are acceptable inputs. Another attribute definition may specify that custom text is an acceptable type of input and may also include a maximum character count for the text input.

During the subsequent display of customization options, the input mechanisms displayed to the customer may be determined based on the attribute definition's specification of the acceptable design input types. For example, if the attribute definition specifies that images of a particular file format are acceptable inputs, a mechanism for uploading mages of the particular file format may be displayed to the customer. If the attribute definition specifies that text input is an acceptable input, a text box for entering text may be displayed to the customer, in which the customer may enter text up to the maximum character limit. If the attribute definition specifies that online drawings are acceptable inputs, a drawing tool may be displayed to the customer.

The attribute definition may specify the set of customization options available for customizing the attribute that corresponds to the attribute definition. For example, an attribute definition for a customizable greeting card for the customizable attribute of "background color" may specify "blue," "yellow", "and "white" as options. As another example, the attribute definition may be for a design input attribute for which the customer provides a design using a drawing area. The attribute definition may specify the colors or drawing tools that the customer may use to input the design. The specifying entity may also specify one or more options as default options that are to be deemed as selected if no other selections are made.

The attribute definition may identify, for each selected location, one or more attribute images and/or option images. Attribute images annotate corresponding locations within the product image. Option images are the images that are to be displayed in an option selection area where the options for the corresponding attribute are displayed. A particular image may be both an option image and an attribute image. For example, a particular image may be displayed in an option selection area, and if the option represented by the option image is selected, the option image may become an attribute image that annotates a corresponding location within the product image.

An attribute image may depict the customizable attribute or a particular option for the customizable attribute. An option image may depict the customization option to which the option image represents. For example, the customizable good may be a customizable table whose tabletop may be comprised of different materials, such as glass, wood, and marble. The attribute definition for the "tabletop material" attribute may include three different option images, where one option image depicts a glass tabletop, another option image depicts a wood tabletop, and a third option image depicts a marble tabletop.

In an embodiment, during subsequent display of customization options, the attribute image displayed in association with a particular customization attribute is, in response to a customer selecting or hovering over a particular customization option, updated to display the option image that represents the particular customization option being selected or hovered over.

In an embodiment, for a particular attribute, there may be a single attribute image that is displayed regardless of which customization options are selected. The attribute definition for the particular attribute may identify only a single attribute image. The single attribute image may depict the customizable attribute generally, the particular customization option depicted in the product image, or the default customization option. In some embodiments, the attribute definition may specify that the attribute image is to include a portion of the user input. For example, the attribute may be a design input attribute, and upon the customer providing the design input, the attribute image may be updated to be the design inputted by the customer. That is, an image depicting the inputted design may replace the prior attribute image. The attribute image may comprise text to be displayed, and the attribute definition may specify the text. The attribute definition may also specify a default image or default text for the design input attribute that is to be displayed until the section input or design input is received. For example, an attribute definition may specify that the text "Your Design Here" is to be displayed until a design input is received.

At block 130, the specification collector receives, from the specifying entity, an attribute definition for each of the locations selected by the specifying entity. Block 130 may involve a user of the specifying entity interacting with a graphical user interface to successively select each of the locations and pick attribute definitions and related values, as described above, from menus, palettes, or other GUI widgets.

At block 140, customization information is stored. The customization information is based on the received attribute location inputs and attributes definitions. For example, the customization information may identify each of the location identified in the attribute location inputs and may comprise information contained in the attribute definitions. The customization information may also include associations between the identified locations and the information contained in the attribute definitions. The customization information may subsequently be used to cause display of graphics and tools for displaying customization option information.

In various embodiments, the customization information is stored at a server computer of the specification collector, such as server computer 608, or separate from the specification collector. For example, the specification collector may store the customization information on computers that are owned and operated by the same entity that owns and operates the specification collector. The customization information may be used to offer custom manufactured product to customers who browse a catalog of available products that the specification collector makes available. Alternatively, the customization information is stored with a server computer that is associated with an ordering system for custom manufactured products that receives and store customization information from a large number of different, unrelated specifying entities, and is configured to generate and provide a catalog of available custom manufactured products from multiple different specifying entities, and to receive and route orders for particular custom manufactured products from customers to the specifying entities. The ordering system of Zazzle, Inc., Redwood City, Calif., is a commercially available example of the latter kind of embodiment.

Figure 2:
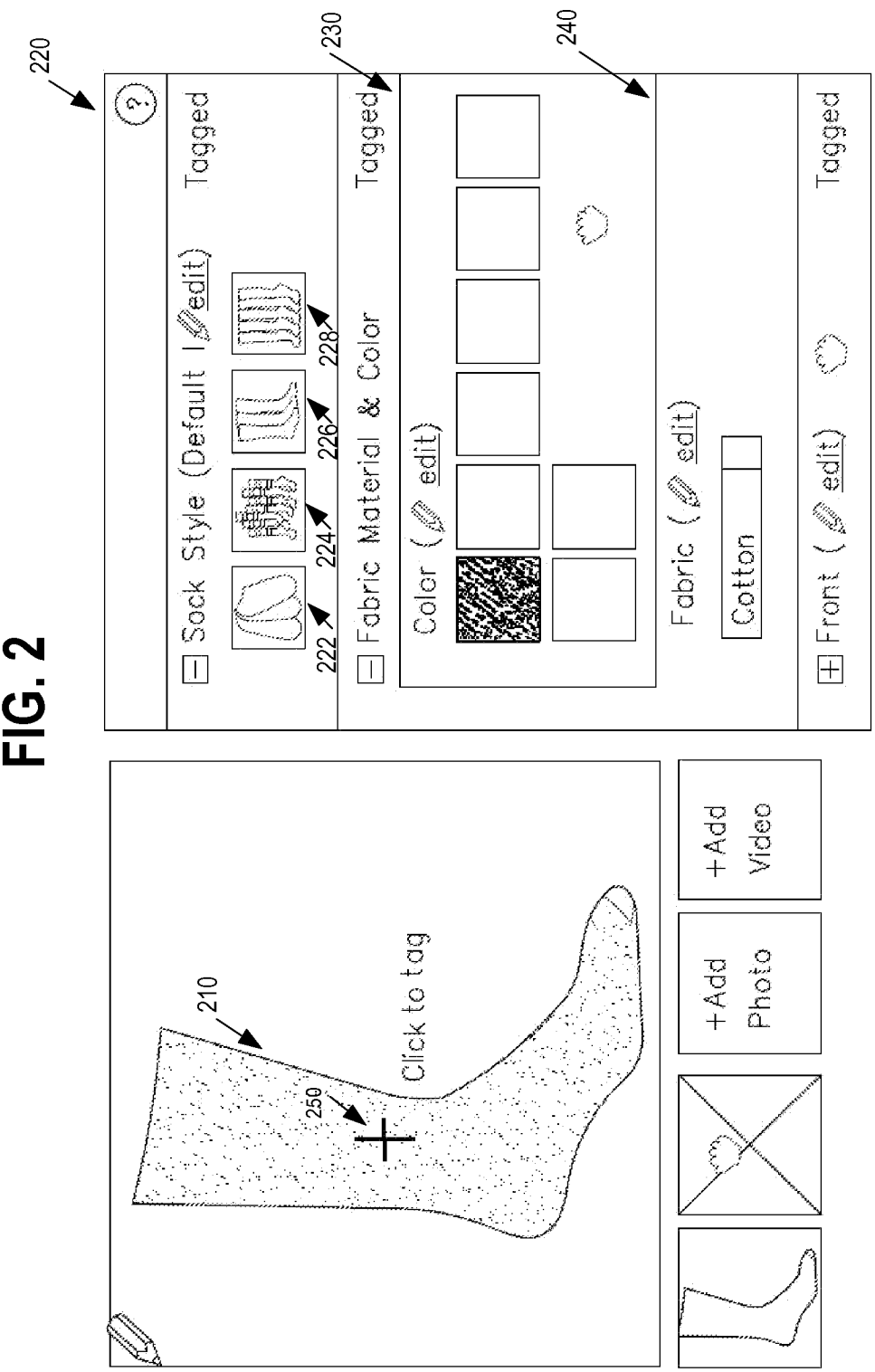
FIG. 2 illustrates an example graphical interface for obtaining attribute location inputs.

FIG. 2 illustrates an example graphical interface for obtaining attribute location inputs. The graphical interface may be displayed at specifying system 602. The attribute location inputs are to be obtained from a specifying entity and the specification collector may cause the example graphical interface to display at the specifying system that is local to the specifying entity.

A specifying entity, or an end user affiliated with the specifying entity, may use the example graphical interface of FIG. 2 to enter attribute location inputs. Option display pane 220 includes attribute information determined based on the received attribute definitions. For purposes of illustrating a clear example, FIG. 2 and other illustrations herein depict an example customizable product in the form of a sock; other embodiments may be implemented in connection with any other kind of customizable product. The received attribute definitions include definitions for the "sock style" attribute, "fabric material" attribute, and "color" attribute. Option images 222, 224, 226, and 228 represent different customization options for the "sock style" attribute. Option image 222 represents the "no show" sock style, attribute image 224 represents the "tube sock" sock style, attribute image 226 represents the "calf length" sock style, and attribute image 228 represents the "knee high" sock style. The specifying entity may provide, as a part of an attribute definition for the "sock style" attribute, each of the option images. The specifying entity may also, as a part of the attribute definition, identify a respective customization options that corresponds to the option image for each option image included in the attribute definition. For example, the specifying entity may specify that option image 222 represents the "no show" sock style, option image 224 represents the "tube sock" sock style, option image 226 represents the "calf length" sock style, and attribute image 228 represents the "knee high" sock style. In the example, attribute definitions are received before the attribute location inputs are received, although the attribute location inputs may be received before attribute definitions in other embodiments. In yet other embodiments, some portions of the attribute definition may be received before the attribute location inputs are received and other portions of the attribute definition may be received after the attribute location inputs are received.

The input mechanism to display for obtaining the different customization options during the customization option display process are also determined based on the attribute definition specified by the specifying entity. The graphical interface displayed during the customization option specification process may include input mechanisms that that serve as a preview of how the input mechanisms will subsequently display to customers during the customization display process.

For example, the input mechanism for the fabric color attribute is a set of selectable images, as displayed in pane 230 of FIG. 2. A customer may indicate a selection of a customization option by selecting a particular option image, such as option image 222 that represents the particular customization option. As another example, the input mechanism for the "fabric" attribute is a drop-down menu, as displayed in pane 240. To cause the example graphical interface of FIG. 2 to display, the specifying entity may specify that both the "color" and "fabric" attributes are selectable attributes where a customer may select a particular customization option by selecting a particular option images for the "color" attributes and an option in an drop-down menu for the "fabric" attribute.

Product image 210 depicts a customizable sock. Using cursor 250, the specifying entity may select locations within the product image 210 to represent identified attributes. In some embodiments, the customer may use the cursor to identify points within the product image 210 of the sock. In other embodiments, the customer may use the cursor to identify regions of a particular shape or different shapes within the product image 210 of the sock.

Figure 3:
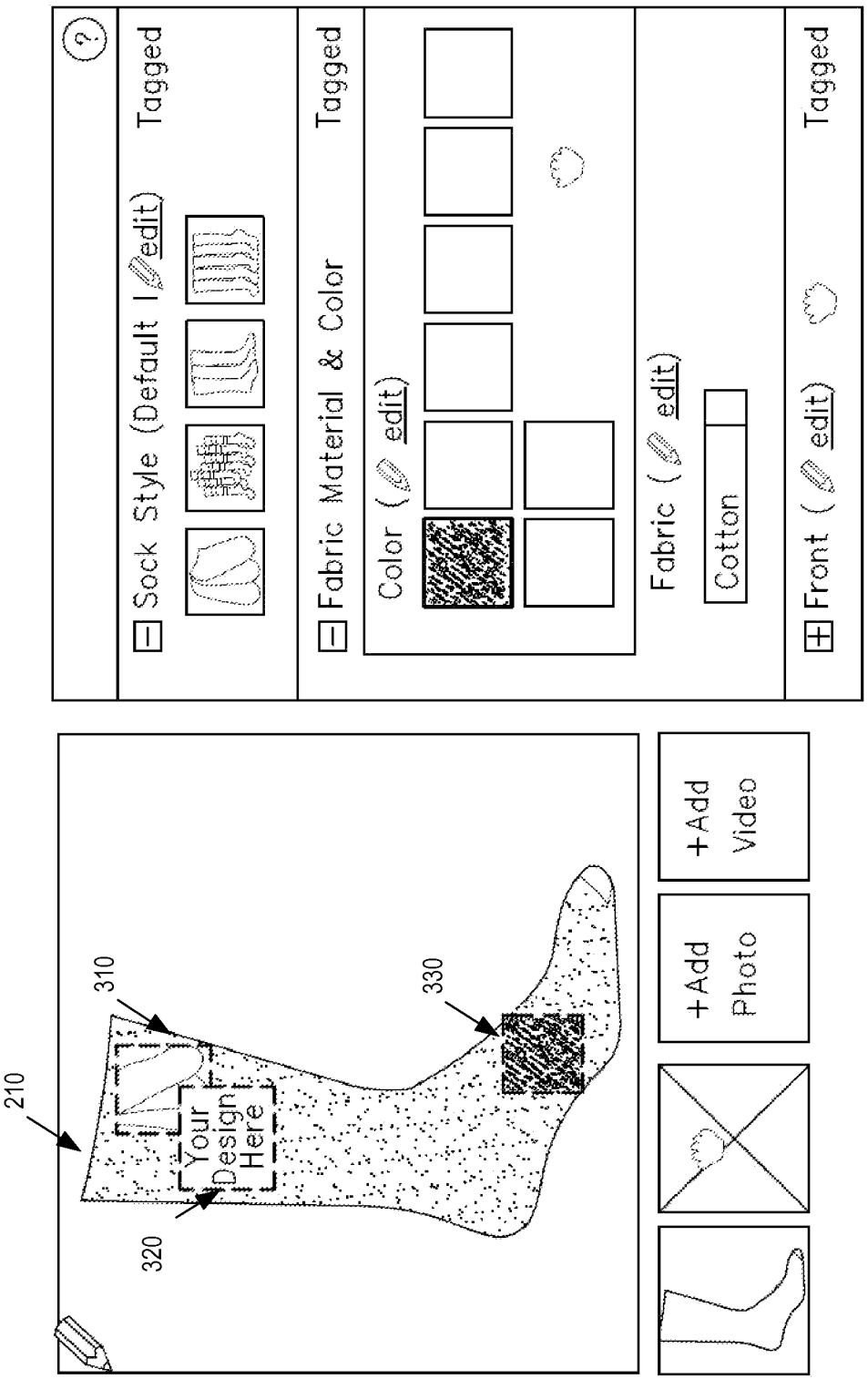
FIG. 3 illustrates the example graphical interface of FIG. 2 after attribute location inputs have been received.

FIG. 3 illustrates the example graphical interface of FIG. 2 after attribute location inputs have been received. The graphical interface of FIG. 3 is displayed after the specifying entity has specified locations 310, 320, 330 within product image 210. The example graphical interface illustrates an embodiment where the specifying entity provides an attribute location input by identifying a square-shaped region within the product image. In other embodiments, the locations may be points or regions of different shapes. The graphical interface displayed to a specifying entity during the attribute location input process, such as the graphical interface of FIG. 3, may also serve as a preview of how the specified attribute images, attribute location inputs, and option information such as option images and customization options will subsequently be displayed to a customer. For example, the attribute images displayed within product image 210 during the attribute location input process may be displayed in the same way to a subsequent customer.

In the illustrated embodiment, the attribute locations are regions rather than points and each attribute images is displayed within the region identified by the respective attribute location input. In other embodiments, the attribute images may be displayed differently, such as beside the corresponding location. The display of the attribute image may indicate an association with the corresponding location. For example, each of the locations corresponding to attribute images 310, 320, 330 are regions, and attribute images 310, 320, 330 are each displayed within their respective regions. In other embodiments, the attribute image may be displayed separate from their respective locations and there may be pointers connected to the attribute images, which point to particular highlighted regions or points of the product image that represent the corresponding locations within the product image.

4. Customization Option Display and Selection Process

The customization information, received in the flexible manner described above and pertaining to any locations of a customizable product that the specifying entity wishes to specify, thereafter may be used in a product ordering computer system that offers and receives orders for custom-manufactured products from customers. In an embodiment, the product ordering system retrieves the customization information and generates and causes displaying of a graphical user interface that depicts a particular customizable product, with indications of the locations that are customizable and the ways in which they are customizable. A customer selects one or more of the locations and indicates which attributes to apply to those locations in a particular instance of the product that the customer might order. The computer system is configured to re-render the visualization of the product with the specified attributes in the specified locations. When the customer is satisfied, the customer may place an order for the instance of the product, customized in the manner shown in the visualization, and the computer system provides data representing the instance to a manufacturer that is capable of custom manufacturing the product and causing delivery of the instance to the customer.

Figure 4:
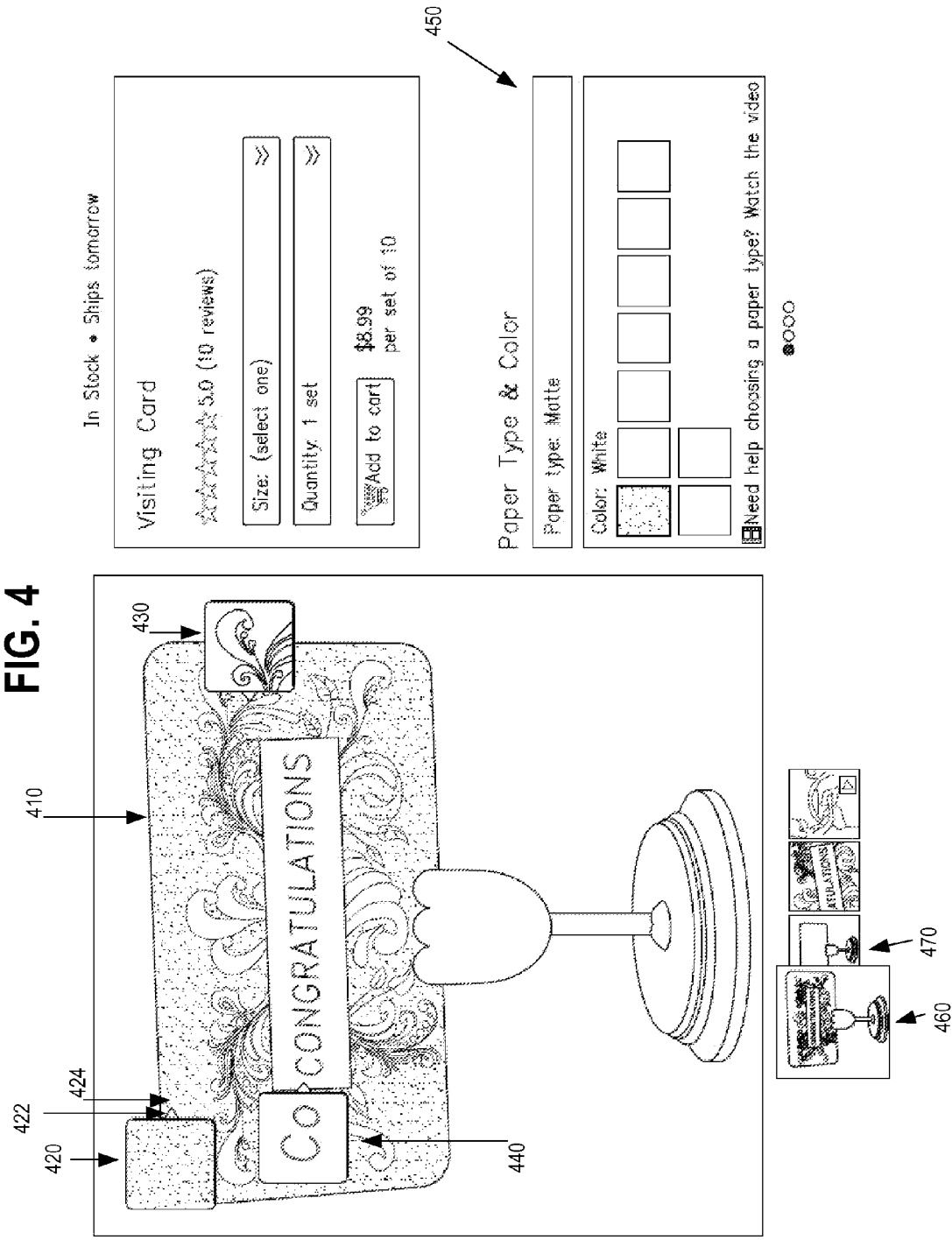
FIG. 4 illustrates an example graphical interface for displaying customization options and obtaining customization option selections.

FIG. 4 illustrates an example graphical interface for displaying customization options and obtaining customization option selections. A displaying entity causes the graphical interface to display. The displaying entity may be a retailer of the customizable product and may be the same entity as the specification collector. Additionally or alternatively, the displaying entity may be the same as, or different than, the specification collector, in various embodiments. The information displayed in the graphical interface may be determined based on the customization information stored in response to receiving the customization option specification.

For purposes of illustrating a clear example, product image 410 depicts a customizable visiting card, but embodiments may be implemented in the context of any kind of customizable product. Attribute images 420, 430, 440 each represent one or more respective customizable attributes. A specifying entity may indicate that two attribute are to be grouped together in the attribute definitions for the two or more attributes that two particular attributes are to be grouped together. For example, the specifying entity for product image 410 may indicate that the attributes "paper type" and "color" of the visiting card are to be grouped together. The result of an attribute grouping may be that the customization options for the two attributes are displayed together. For example, the customization options for the "paper type" and "color" attribute are both displayed under the same heading of "Paper Type & Color" in pane 450. The drop down menu containing the customization options for the "paper type" attribute is displayed within the same pane as the option images for the "color" attribute. Another result of the attribute grouping may be that a single attribute image represents each attribute in the grouping. For example, attribute image 420 represents both the "paper type" and "color" attribute.

The display of attribute image 420 indicates an association with point 424. Pointer 422, which is connected to attribute image 420 points to point 424. Point 424 is a location in the background region of the visiting card which represents the associated attribute of "paper type" and "color", and a location in the background region may have been chosen as the attribute location because it depicts the "paper type" and "color" attributes of the card.

Attribute image 440 represents the "display text" attribute which may be customized to display some text entered by the customer. The customer may enter a design input of text, which may be printed instead of the text displayed in the product image.

Attribute image 430 represents the "embellishment" attribute, which may be both a design input attribute and a selection input attribute. The customer may have the option to select a design from among a set of customization options presented to the customer, to upload a custom design image, or to draw a custom design image using a drawing tool presented to the customer via the graphical interface. The selected customization option, whether it is a custom design or an option selected from the set of presented options, is to be printed as the embellishment on the visiting card instead of the displayed embellishment.

The attribute images that are displayed before the customer selects a customization options may vary according to different embodiments and for different attributes. In some embodiments, there may not be an attribute image displayed until the customer selects a customization option for the attribute. In another embodiment, the attribute image that is displayed prior to the customer selecting a customization option for the corresponding attribute is the option image for the customization option depicted in the product image. For example, attribute image 430 is an option image of the embellishment option shown in product image 410. In other embodiments, the attribute image that is displayed prior to the customer selecting a customization option for the corresponding attribute is the option image representing the default customization option that is selected if the customer does not provide a customization option selection. As used herein, the term "customization option selections" includes customer selections indicated via selection inputs and design inputs. The displaying entity may determine which attribute image to display for a particular attribute based on the stored customization information.

After the customer selects a particular customization option, the attribute image may be updated to display the option image for the selected customization option. In some embodiments, the attribute image may also be updated to a corresponding option image in response to the customer hovering over the option image or some other option component representing the customization option. Generally only the attribute image which annotates the product image is updated and the product image itself is not altered in response to a customer selection, although this is not required in every embodiment.

In a preferred embodiment, each customizable attributes of a customizable product is represented by an attribute image that annotates a particular location within the product image, although this may not be the case in every embodiment. Before customer selection, annotating the product image with images that depict the customizable attributes allows a customer to visualize the different ways in which a customizable product may be customized. After customer selection, annotating the product image with images that depict selected customizable attributes allows a user to visualize the final product that will be customized according to the selected customization options.

A customer may view different views of the product image. Different attribute images representing different customizable attributes may be displayed in each view. For example, view images 460, 470 in FIG. 4 represent product image views that each displays the visiting card from different viewpoints. View image 460 represents the front view of the visiting card as displayed in product image 410. View image 470 displays the back view of the visiting card. A customer may click on the different view images to cause display of the corresponding product image view. As the product image changes to a different view of the product image, the accompanying attribute images may also change. For example, there may be "back display text" attribute representing the text that is displayed on the back of the visiting card. An attribute image representing the "back display text" attribute may annotate a location within the product image of the back view of the visiting card. The "back display text" attribute may only be represented in the back view of the visiting card and not in the front view. The product image view and accompanying attribute images may change in response to a customer selection of one of the view images. In some embodiments, the product image view and accompanying attribute images may automatically change to a particular view in response to a customer selecting a particular attribute component representing a particular attribute displayed in the particular view. The particular attribute component may, for example, be a selectable heading displayed in an option display pane displayed to the side of the product image. For example, a customer may cause the view to change to a back view by selecting a "Back Display Text" heading for the "back display text" attribute or by selecting a text box which may be used to enter custom text to for the "back display text" attribute.

In some embodiments, the customization options for each of the customizable attributes are concurrently displayed to the user. They may be displayed in an option display pane separate from the product image. In other embodiments, the customization options are displayed for one attribute at a time or for a group of attributes at a time. For example, in pane 450 of FIG. 4, only the customization options for the "paper type" and "color" attributes are displayed. A customer may cause customization options for other attributes to be displayed by selecting an advancement option for advancing to the next set of customizable attributes. By selecting the advancement option, the customer may also cause the product image to change to a different view. For example, the next set of customizable attributes may include attributes that are only represented by attribute images displayed in a back view of the visiting card, and thus, the customer's selection of the advancement option may cause the product image to change to an image depicting the back view of the visiting card.

In an embodiment, a maker's specification of attribute groupings may be enforced as rules for a customer's specification of customization options. For example, if a maker specifies that two customization options belong to the same grouping, the specification collector may display information for both customization options in the same section or page. As another example, a maker may specify that two customization options are mutually exclusive. Based on the specification, the specification collector may only allow a customer to specify a customization option selection for one of the two mutually exclusive customization options. The specification collector may cause a radio button, drop down menu option, or some other component representing a first option of the two mutually exclusive customization options to disappear in response to a customer's selection of an option for the second option of the two mutually exclusive customization options.

In other embodiments, a maker's specification of option groupings or other indications of compatibility between various customization options may control how the customization options are presented to a customer in other ways. A maker may specify that certain customization options are not to be available to a customer and these options may be filtered out for the corresponding customizable products. A customer may not have the option to select those customization options or, if the customer is allowed to select an option, the selection may not be included in the set of customer selections that are automatically sent to a manufacturer in response to receiving customer specification.

In other embodiments, a customer may cause customization options for a different particular attribute to be displayed by selecting one of the attribute images that annotate the product image. In response to the selection, the customization options for the attribute represented by the selected attribute image are displayed. For example, a customer may select product image 440 which represents the "embellishment" attribute to cause display of customization option information for the "embellishment" attribute. Customization option information may include text and/or option images representing different customization options for the respective attribute.

The displaying entity may determine the interface components to display based on the stored customization information. The interface components may include components such as particular attribute images, particular customization options, and particular customization option images. The method of displaying the interface component may also be based on the stored customization information. For example, a determination to display the customization as a list beside selectable radio buttons may be based on the stored customization information. The stored customization information may include information indicated by the specifying entity during the location selection and attribute definition process.

In an embodiment, a user specifies customization option selections via a search query identifying attribute settings. In response to receiving the query, a query handling computer may select one or more products having customizable options corresponding to the customization option selections. The query handling computer may cause one or more customizable product images to be displayed representing the selected products. The attribute images displayed in association with the customizable product image may represent customization option selections included in the attribute settings.

For example, a user may submit a search query specifying "yellow" as a background color and of "blue" as a border color. In response to receiving the search query, the query handling computer may display one or more products having customizable options of "background color" and "border color". The product images may be displayed in association with attribute images representing background color of yellow and border color of blue.

Or in another example, a user may submit a search query for a "purple alligator handbag". The "handbag" term may be used to match a product, such as a purse, with a term of "handbag" associated with it, the "alligator" term, may be used to set a product option for a portion of the product, such as the cover of the handbag which has a leather material with an associated term "alligator". The product option of "purple" may set the product option for the inside lining for the product which has a term of "purple" associated with it. This product may then be displayed with these options, along with other products that had similar matches.

In another instance, "handbag" may also match a term specified for a cloth shopping bag. Since a product option for the shopping bag may have an image associated with it, "alligator and purple" are used to find an image of a purple alligator which may be associated with the shopping bag, so a product which is a cloth shopping bag with a picture of a purple alligator is displayed as well.

A user may indicate a selection to purchase a particular displayed product and may not need to specify any customization option selections in addition to the selections included in the query attribute settings. In response to the user's selection, a product supplier may automatically manufacture and ship the product to the user. The user may not need to have any further interactions with the system other than the submission of the search query and the selection of a product for purchase.

5. Variable Product Image Portions

In some embodiments, customizable attributes are mapped to corresponding portions of the product image, and selected customization options are indicated to a customer by causing the corresponding portion of the product image to change to new image portion. This method of indicating customization option selects may be an alternative to annotating a location of the product image with an attribute image. The new image portion may depict the selected customization option. For example, the customizable product may be a shoe and the toe style of the shoe may be customizable. The toe style may be "rounded", "pointed", or "open toe". In response to the a customer selecting the customization option of "rounded" for the "toe style" attribute, the product image may update so that the portion of the product image representing the "toe style" attribute depicts a "rounded toe." The remainder of the product image may remain unaltered. The product image regions corresponding to the various customizable attributes may be displayed seamlessly, so that a customer is unable to determine the exact boundaries of the product image portion that corresponds to a particular attribute. In other embodiments, the product image portions may be outlined or may be indicated to a customer in some other way.

In addition to being associated with a respective product image portion, each attribute of a set of customizable attributes may be associated with a set of option images, where each option image depicts a respective customization option. In response to a selection of a particular customization option, the corresponding product image region may update to display the image portion corresponding to the particular customization option. Different portions of the product image may correspond to different customizable attributes. Continuing with the above example, a portion of the shoe product image depicting the heel of the shoe may correspond to the "heel length" attribute and a different portion of the shoe product image that depicts the sole of the shoe, may correspond to the "sole shape" attribute.

The different images portions that correspond to the customization options may be provided by an image provider that is the same as the specifying entity that specifies customization options. Customization option information, which is determined based on the received attribute definitions and is stored in response to receiving the attribute definitions, may be used to determine image specifications. Image specifications comprise instructions to the specifying entity regarding the types of images that must be provided by the specifying entity. The specifying entity may indicate which customization option a particular image portion corresponds.

Figure 5:
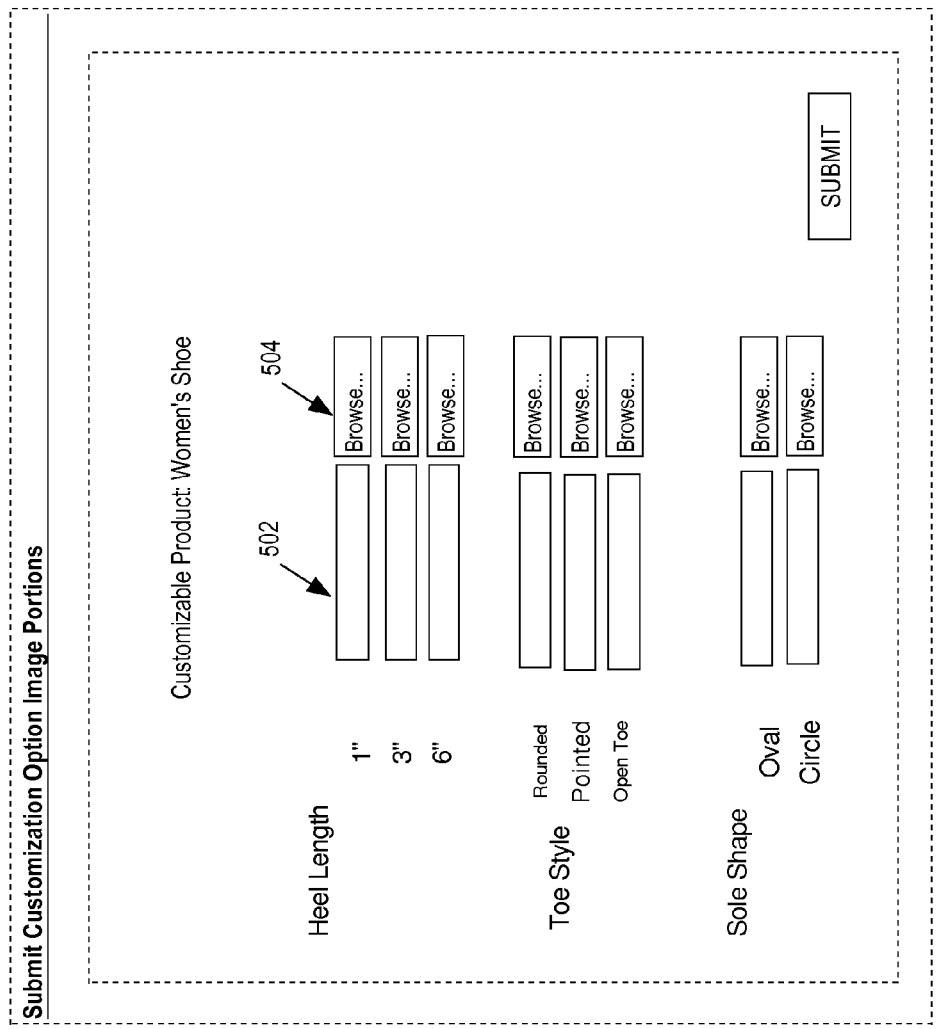
FIG. 5 illustrates an example graphical interface for obtaining image portions corresponding to various customization options.

FIG. 5 illustrates an example graphical interface for obtaining image portions corresponding to various customization options. The graphical interface may be displayed to a specifying entity. For purposes of illustrating a clear example, FIG. 5 depicts the customizable product as a show, but other embodiments may be implemented in connection with any kind of customizable product. The graphical interface presents the customizable attributes of "heel length", "toe style", and "sole shape" and customization options of "1"", "3"", "6"", "Rounded", "Pointed", "Open Toe", "Oval", and "Circle." The list of customizable attributes and customization options presented to an image provider via the graphical interface may be determined based on the attribute definitions received from the specifying entity.

An image portion collector may cause the display of the graphical interface of FIG. 5. The image portion collector may be the same entity as the specification collector. The graphical interface displayed to the specifying entity may provide a mechanism for obtaining the product image portions. The text boxes displayed next to the customization option titles, such as text box 502, are text boxes for entering the pathnames for the product image portions. A specifying entity may select a browse buttons displayed next to the text boxes, such as browse button 504, to locate the pathname for a product image portion stored at a specifying system.

A specifying entity would likely upload a separate product image portion for each customization option. Each product image portion may depict a portion of the customizable product in accordance with the respective customization option. For example, the product image uploaded for the "1"" attribute may be depict the heel portion of a customizable shoe with a heel height of 1". The product image uploaded for the "Circle" attribute may depict the sole portion of a customizable shoe with a circle-shaped sole.

The image specifications may comprise the list of customizable options for which the specifying entity is to provide image portions. The image specifications may be provided to the specifying entity via a graphical interface such as the one illustrated. The image provider may identify a corresponding customization option for each image by choosing the appropriate text box for entering the pathname for the image portion.

When an image provider submits the information entered via the graphical interface of FIG. 5, the uploaded images may be received by the image portion collector. The image portion collector may receive image portion information that associates product image portions with their corresponding customization options. For example, the image portion collector may receive a product image portion representing a 3" heel height in association with the customization option name "3"". The image portion collector may be the same entity that causes a portion of the product image to update to a particular product image portion in response to a customer selecting customization option corresponding to the particular product image portion.

A maker, or some other entity, may specify descriptive terms to be associated with a customizable product or a particular customizable option of the customizable product. The descriptive terms may describe or be related in some other way to the corresponding customization option. For example, the customization option of "fabric" may also be associated with descriptive terms such as "texture", 'cloth", or "material" because those may be similar words for expressing the same customization option. As another example, the customizable product of "sandal" may be associated with descriptive terms "wedge", "summer shoes", "and open toe shoes".

The descriptive terms may be stored in association with other information received form a maker, such as set of customization options and attribute images as a part of the customizable object's customization specification. The customization specifications may be searchable.

Customizable products may be included in search results based on the descriptive terms. A customizable product may be returned as a search result to a customer query in response to a match between the query and descriptive terms associated with the customizable product or customizable options. The set of descriptive terms that matched the search query may be displayed in association with the customizable product in the search results.

6. Customization Option Specification, Customer Selection, and Manufacture

Figure 7:
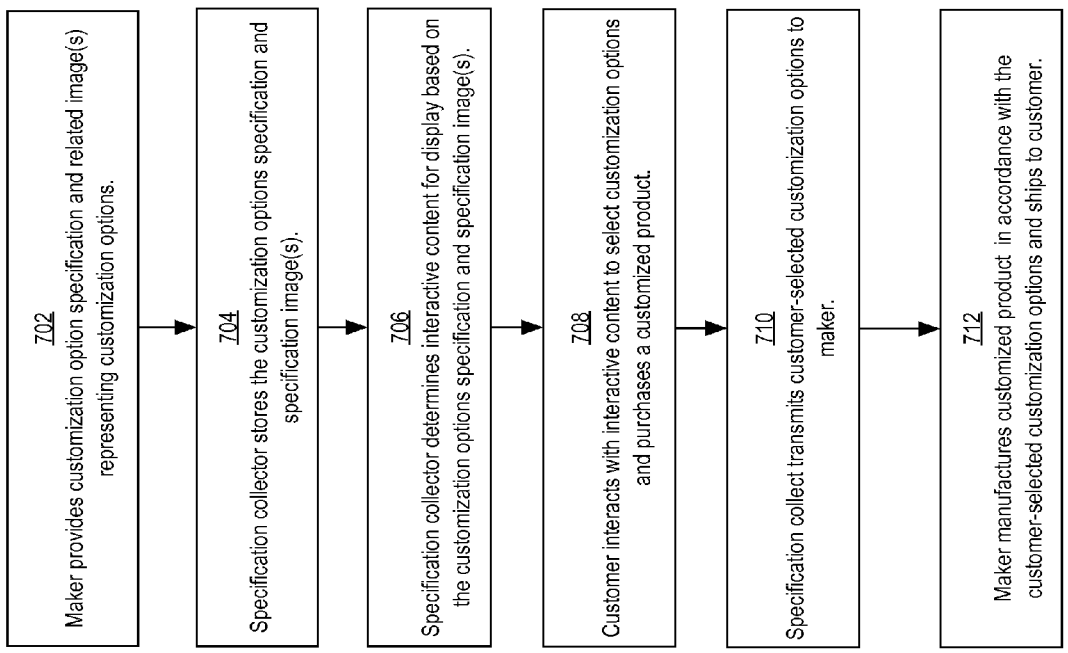
FIG. 7 illustrates an example process including a maker's specification of customization options, a customer's selection of customization options, and the maker's manufacture of the customization option.

FIG. 7 illustrates an example process including a maker's specification of customization options, a customer's selection of customization options, and the maker's manufacture of the customization option. At block 702, the maker provides customization option specification and related image(s) representing customization options. Maker and manufacturer may be used interchangeably and refer to the entity that creates the product according to the customer's specifications.

At block 704, the specification collector stores customization options specifications and specification image(s). The specification collector may be a manual service or an automated service provided to intake the maker's description of the product in a structured manner, and to associated media that annotates the description with the description. The specification collector may cause a series of web interfaces and forms to be displayed for collecting the customization specification.

At block 706, the specification collector determines interactive content for display based on the customization options specification and specification image(s). The specification collector may determine a rendering asset that comprises instructions for rendering the images and options with which a customer may interact to specify customization option selections. The rendering asset may be determined and stored until customization products and options are to be presented to a customer.

At a later time, the specification collector may cause the interactive content to display in response to a customer request to view customizable products, such as via a search query. At block 708, a customer interacts with interactive content to select customization options and purchases a customized product. FIG. 4 illustrates one example of a graphical user interface comprising interactive content, with which a user may interact to specify customization option selections. At block 710, the specification collector transmits customer-selected customization options to maker. At block 712, the maker manufactures customized product in accordance with the customer-selected customization options and ships to customer.

7. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
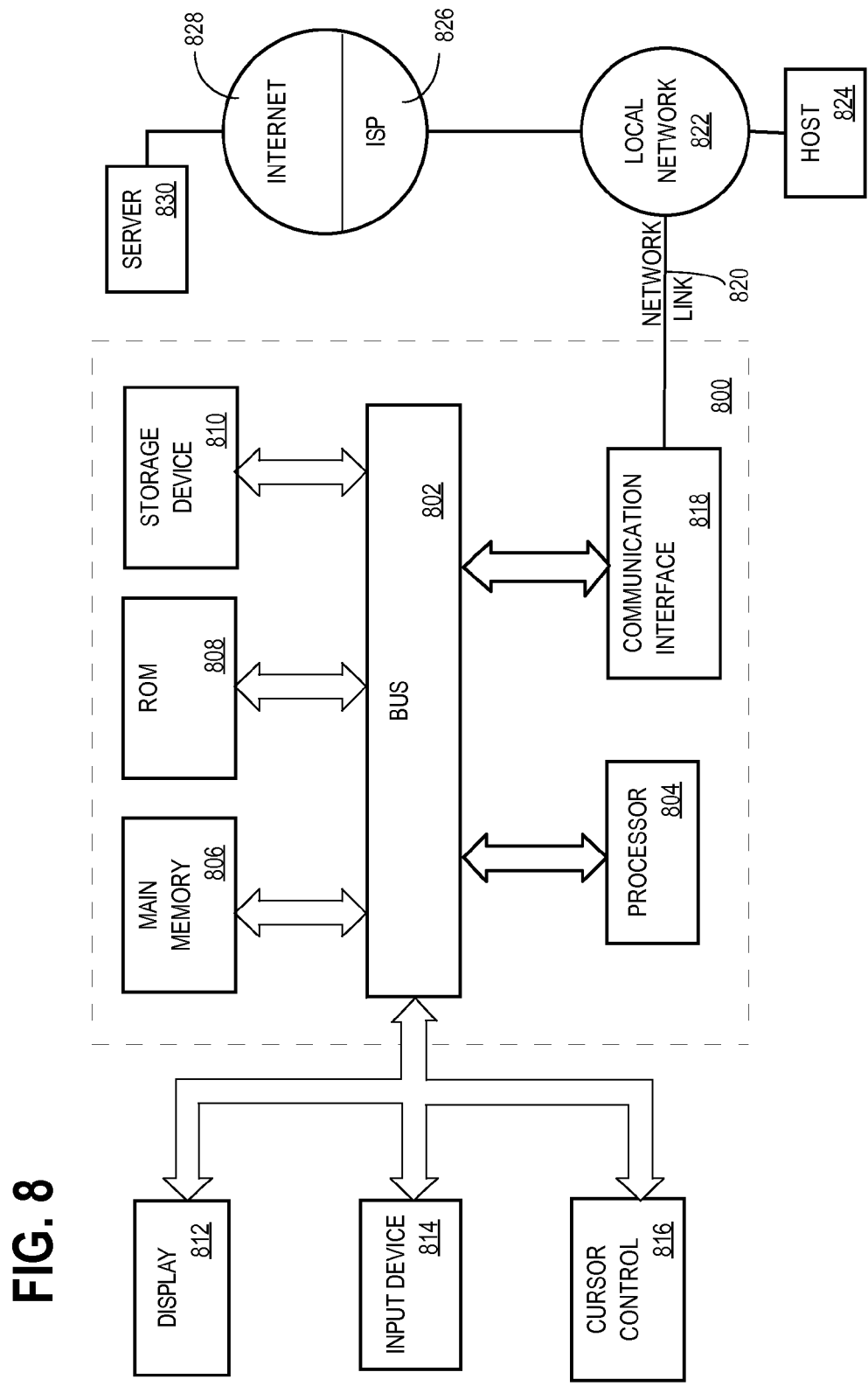
FIG. 8 is a block diagram that illustrates a computer system with which the techniques herein may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 630 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    causing, by a server computer through a display of a specifying system, display of a product image depicting a customizable product;
    after causing display of the product image depicting the customizable product, receiving, by the server computer from the specifying system:
    one or more attribute location inputs, wherein each attribute location input identifies a location within the product image that does not include the entire product image; and
    an attribute definition for each of the one or more attribute location inputs, wherein each attribute definition defines a customizable attribute associated with the respective attribute location input and a set of customization options available for customizing the customizable attribute associated with the respective attribute location, wherein each attribute definition defines whether a design input is enabled for the set of customization options available for customizing the customizable attribute, wherein the server is configured to generate an interface for a client computing system to provide a design for the customizable attribute if the design input is available; and
    in response to receiving the one or more attribute location inputs and the attribute definition for each of the one or more attribute location inputs from the specifying system, storing, in volatile or non-volatile storage accessible by the server computer, customization information, wherein the customization information associates the locations specified in the location inputs with attribute definition information included in the respective attribute definition.

2. The computer-implemented method of claim 1, wherein each attribute definition indicates one or more types of acceptable user inputs.

3. The computer-implemented method of claim 1, wherein each customizable attribute is associated with one or more option images, and wherein each option image represents a respective customization option.

4. The computer-implemented method of claim 1, wherein the attribute location inputs and attribute definitions are received from a specifying entity and the product image is based on an image provided by the specifying entity.

5. The computer-implemented method of claim 1, further comprising:
  determining, based on the stored customization information, image specifications, identifying one or more customization options to be depicted by a set of requested image portions; and
  providing the image specifications to an image provider.

6. The computer-implemented method of claim 1, further comprising:
  generating, based on the received attribute definition and the one or more attribute location inputs, a rendering asset comprising instructions for displaying the product image depicting a customizable product and at least one attribute image representing a particular customizable attribute displayed in association with a particular location representing the particular customizable attribute;
  wherein the rendering asset further comprises instructions for displaying a particular customization option image in response to receiving selection of a particular customization option.

7. The computer-implemented method of claim 6, further comprising:
  in response to a user indication to view one or more customizable products, causing display of the product image depicting a customizable product based on the rendering asset, wherein the product image depicts the customizable product and the at least one attribute image representing the particular customizable attribute displayed in association with the particular location representing the particular customizable attribute;
  receiving user selection of customization options; and
  in response to receiving the user selection of customization options, automatically sending the user selection of customization options to a maker.

8. A computer-implemented method, comprising:
  causing, by a server computer on a display of a client computing system, display of a product image depicting a customizable product, wherein one or more locations within the product image are each associated with a respective customizable attribute, wherein none of the one or more locations include the entire product image;
  causing, by the server computer on the display of the client computing system, display of, in association with a particular location of the one or more locations within the product image, an attribute image representing a particular customizable attribute associated with the particular location;
  wherein the customizable attribute is an attribute of the product that is customizable;
  wherein the particular location of the one or more locations is associated with an attribute definition that identifies a set of one or more customization options for the customizable attribute;
  determining, by the server from the attribute definition that identifies the set of one or more customization options for the customizable attribute, whether a design input is enabled for the customizable attribute; and
  in response to determining that a design input is enabled for the customizable attribute, generating, by the server computer, an interface for the client computing system to provide a design for the customizable attribute to the server computer.

9. The computer-implemented method of claim 8, wherein the display of the attribute image is caused in response to determining a selection of the particular point or region.

10. The computer-implemented method of claim 8, wherein the attribute image represents a particular customization option.

11. The computer-implemented method of claim 10, wherein receiving the selection of the particular customization option comprises receiving a design input, and wherein the particular customization option image depicts a design included in the design input.

12. The computer-implemented method of claim 8, wherein the attribute image represents a default customization option.

13. The computer-implemented method of claim 8, wherein the customizable attribute is associated with a plurality of customization options, including a particular customization option, and wherein the method further comprises:
  receiving a selection of the particular customization option; and
  in response to receiving the selection of the customization option, causing display of a particular customization option image representing the selected particular customization option.

14. The computer-implemented method of claim 13, wherein the particular customization option image replaces the attribute image.

15. The computer-implemented method of claim 8, further comprising:
  determining a particular user input type associated with the particular customizable attribute; and
  causing an input area of the particular user input type to be displayed.

16. The computer-implemented method of claim 8, further comprising:
  receiving a customer product search query identifying a customization option selection for one or more specified customization options; and
  determining the attribute image based on the attribute definition, wherein the attribute image represents the selection of the particular customization option.

17. One or more non-transitory computer-readable media storing instruction, which, when executed by one or more processors, cause one or more computing devices to perform operations comprising:
  causing, by a server computer through a display of a specifying system, display of a product image depicting a customizable product;
  after causing display of the product image depicting the customizable product, receiving, by the server computer from the specifying system:

one or more attribute location inputs, wherein each attribute location input identifies a location within the product image that does not include the entire product image; and an attribute definition for each of the one or more attribute location inputs, wherein each attribute definition defines a customizable attribute associated with the respective attribute location input and a set of customization options available for customizing the customizable attribute associated with the respective attribute location, wherein each attribute definition defines whether a design input is enabled for the set of customization options available for customizing the customizable attribute, wherein the server is configured to generate an interface for a client computing system to provide a design for the customizable attribute if the design input is available; and in response to receiving the one or more attribute location inputs and the attribute definition for each of the one or more attribute location inputs from the specifying system, storing, in volatile or non-volatile storage accessible by the server computer, customization information, wherein the customization information associates the location specified in the location inputs with attribute definition information included in the respective attribute definition.

18. The non-transitory computer readable media of claim 17, wherein each attribute definition indicates one or more types of acceptable user inputs.

19. The non-transitory computer readable media of claim 17, wherein each customizable attribute is associated with one or more option images, and wherein each option image represents a respective customization option.

20. The non-transitory computer readable media of claim 17, wherein the attribute location inputs and attribute definitions are received from a specifying entity and the product image is based on an image provided by the specifying entity.

21. The non-transitory computer readable media of claim 20 further storing instructions that cause the one or more computing devices to perform operations comprising:
determining, based on the stored customization information, image specifications, defining one or more customization options to be depicted by a set of requested image portions; and
providing the image specifications to an image provider.

22. The non-transitory computer readable media of claim 17 further storing instructions that cause the one or more computing devices to perform operations comprising:
generating, based on the received attribute definition and the one or more attribute location inputs, a rendering asset comprising instructions for displaying the product image depicting a customizable product and at least one attribute image representing a particular customizable attribute displayed in association with a particular location representing the particular customizable attribute;
wherein the rendering asset further comprises instructions for displaying a particular customization option image in response to receiving selection of a particular customization option.

23. The non-transitory computer readable media of claim 22 further storing instructions that cause the one or more computing devices to perform operations comprising:
in response to a user indication to view one or more customizable products, causing display of the product image depicting a customizable product based on the rendering asset, wherein the product image depicts the customizable product and the at least one attribute image representing the particular customizable attribute displayed in association with the particular location representing the particular customizable attribute;
receiving user selection of customization options; and
in response to receiving the user selection of customization options, automatically sending the user selection of customization options to a maker.

24. One or more non-transitory computer-readable media storing instructions, which, when executed by one or more processors, cause one or more computing devices to perform operations comprising:
causing, by a server computer on a display of a client computing system, display of a product image depicting a customizable product, wherein one or more locations within the product image are each associated with a respective customizable attribute, wherein none of the one or more locations include the entire product image;
causing, by the server computer on the display of the client computing system, display of, in association with a particular location of the one or more locations within the product image, an attribute image representing a particular customizable attribute associated with the particular location;
wherein the customizable attribute is an attribute of the product that is customizable;
wherein the particular location of the one or more locations is associated with an attribute definition that identifies a set of one or more customization options for the customizable attribute;
determining, by the server from the attribute definition that identifies the set of one or more customization options for the customizable attribute, whether a design input is enabled for the customizable attribute; and
in response to determining that a design input is enabled for the customizable attribute, generating, by the server computer, an interface for the client computing system to provide a design for the customizable attribute to the server computer.

25. The non-transitory computer readable media of claim 24, wherein the display of the attribute image is caused in response to determining a selection of the particular point or region.

26. The non-transitory computer readable media of claim 24, wherein the attribute image represents a particular customization option.

27. The non-transitory computer readable media of claim 26, wherein receiving the selection of the particular customization option comprises receiving a design input, and wherein the particular customization option image depicts a design included in the design input.

28. The non-transitory computer readable media of claim 24, wherein the attribute image represents a default customization option.

29. The non-transitory computer readable media of claim 24, wherein the customizable attribute is associated with a plurality of customization options, including a particular customization option, and wherein the non-transitory computer readable media of claim 24 further stores instructions that cause the one or more computing devices to perform operations comprising:
receiving a selection of the particular customization option; and
in response to receiving the selection of the customization option, causing display of a particular customization option image representing the selected particular customization option.

30. The non-transitory computer readable media of claim 29, wherein the particular customization option image replaces the attribute image.

31. The non-transitory computer readable media of claim 24 further storing instructions that cause the one or more computing devices to perform operations comprising:
   determining a particular user input type associated with the particular customizable attribute;
   causing an input area of the particular user input type to be displayed.

32. The non-transitory computer readable media of claim 24 further storing instructions that cause the one or more computing devices to perform operations comprising:
   receiving a customer product search query identifying a customization option selection for one or more specified customization options; and
   determining the attribute image based on the attribute definition, wherein the attribute image represents the selection of the particular customization option.

* * * * *